United States Patent [19]

Schlitt

[11] Patent Number: 5,062,215

[45] Date of Patent: Nov. 5, 1991

[54] CONTINUOUS TAPE MEASURE

[75] Inventor: George J. Schlitt, Raleigh, N.C.

[73] Assignee: Cooper Industries, Inc., Houston, Tex.

[21] Appl. No.: 657,983

[22] Filed: Feb. 21, 1991

Related U.S. Application Data

[63] Continuation of Ser. No. 383,308, Jul. 18, 1989, abandoned, which is a continuation of Ser. No. 219,662, Jul. 14, 1988, abandoned.

[51] Int. Cl.$^5$ .................................................. G01B 3/10
[52] U.S. Cl. .......................................... 33/755; 33/494; 33/759
[58] Field of Search .................. 33/494, 755, 761, 759, 33/809, 458, 491, 483, 487

[56] References Cited

U.S. PATENT DOCUMENTS

| | | | |
|---|---|---|---|
| 224,401 | 2/1880 | Derickson | 33/161 |
| 563,277 | 7/1896 | Jewell | 33/809 |
| 857,416 | 6/1907 | Schwartz | 33/491 |
| 2,554,099 | 5/1951 | Ermold | 33/487 |
| 2,728,143 | 12/1955 | Buchet | 33/138 |
| 3,004,346 | 10/1961 | Quenot | 33/765 |
| 3,330,709 | 7/1967 | Zelnick . | |
| 3,336,674 | 8/1967 | Higgins et al. . | |
| 3,409,988 | 11/1968 | Zelnick . | |
| 3,439,428 | 4/1969 | Zelnick . | |
| 4,527,334 | 7/1985 | Jones et al. . | |

Primary Examiner—Harry N. Haroian
Attorney, Agent, or Firm—David A. Rose

[57] ABSTRACT

The measuring tape includes a measuring scale on both sides of the metal tape. The upper surface of the tape is scaled from zero to a number equal to the length of the tape, and the underside of the tape is scaled from the length of the tape of a measurement equal to twice the length of the tape. Thus, the tape can be used to measure a distance equal to twice its length.

2 Claims, 2 Drawing Sheets

CONTINUOUS TAPE MEASURE

RELATED APPLICATION

This is a continuation application of co-pending U.S. Pat. application Ser. No. 07/383,308, filed July 18, 1989 which was a continuation application of co-pending U.S. Pat. application Ser. No. 07/219,662, filed July 14, 1988, both now abandoned.

BACKGROUND OF THE INVENTION

This invention pertains to the field of graduated measuring devices and, more particularly, to measuring tapes used to measure distances.

Measuring tapes are well known in the art, and are used to measure a distance between objects, a distance from a known point, or the length of an object. Measuring tapes are linear measuring devices which include a graduated steel tape blade for measuring a distance, typically up to 300 feet. Most prior art measuring tapes are comprised of a metal tape blade which is scaled in units of measure such as the foot or yard having the base 12 or 10, or the meter based on the metric system having the base 10; a case having a retraction system to retract the tape blade into the case and to provide a means for compact storage of the tape when not in use; and a stop at the end of the tape which is used to anchor the tape when measuring a length or distance and which prevents the tape from fully retracting into the case. Graduated measuring devices also include rulers, collapsible tapes, steels, manual tape measures, woven tapes, and protractors, or circular measuring devices.

Prior art measuring tapes are limited in that they have graduations equal to the length of the tape blade and thus can only measure a distance equal to the length of the tape blade. Although the measuring tape can be used to measure a distance longer than the actual tape length by making a second measurement in series with the first, this requires that the user add the first measurement to the second measurement to determine the total measured distance. This addition may be performed mentally or may require recording the measurements for addition. The manual recording of measurements for addition is inconvenient since it requires putting down the measuring tape, locating a writing utensil and paper, recording the multiple measurements, and then adding the measurements. Such calculations may lead to errors in addition.

The present invention includes a continuous graduated measuring tape capable of measuring a distance greater than its length to overcome these deficiencies of the prior art. Other objects and advantages of the present invention will become apparent from the following description.

SUMMARY AND OBJECT OF THE INVENTION

The present invention is a linear measuring device which may be used to measure distances greater than the length of the device. The device has a first surface which is imprinted with a graduated scale having graduations from zero to N, where N is the length of the device and another surface having graduations from N to 2N. Multiple surfaces N of the device may be employed, such that the device may measure N times its length without the need for the user to add individual measurements to determine the measured distance.

The preferred embodiment of the measuring tape of the present invention includes a two-sided tape blade retractable into a case and which will measure a distance twice the graduated length of the tape. The upper surface of the tape blade has graduations which begin at the free end of the tape, and end near the total retractable length of the tape blade. A small length at the end of the tape normally does not have graduations therein. The underside of the tape blade also has graduations. These additional graduations begin at the last graduated measure on the first side of the tape blade and continue to a graduated length of twice the graduated length. For example, if a standard 300 inch (25 foot) tape is employed, the upper side of the tape is graduated with markings which correspond from zero to 300 inches, and the underside of the tape is graduated from 300 to 600 inches. Thus, to measure a 400 inch distance, the tape is fully extended and a mark is made. The tape is then turned over, and the 400 inch mark measured out. Although application of the invention to a tape measure is described, it should be appreciated that the invention is equally applicable to non-self-retracting measures, as well as steels, rulers, protractors, and other measuring devices having multiple sides.

The object of this invention is to provide a graduated measuring device which will measure a distance greater than its length.

BRIEF DESCRIPTION OF THE DRAWINGS

The above and other objects and advantages of the present invention will become apparent from the following description when read in conjunction with the accompanying drawings wherein.

The invention may take form in various parts and arrangements of parts. The drawings are only for purposes of illustrating the preferred embodiments of the present invention and are not to be construed as limiting it.

DESCRIPTION OF THE PREFERRED EMBODIMENT

Figure 1:
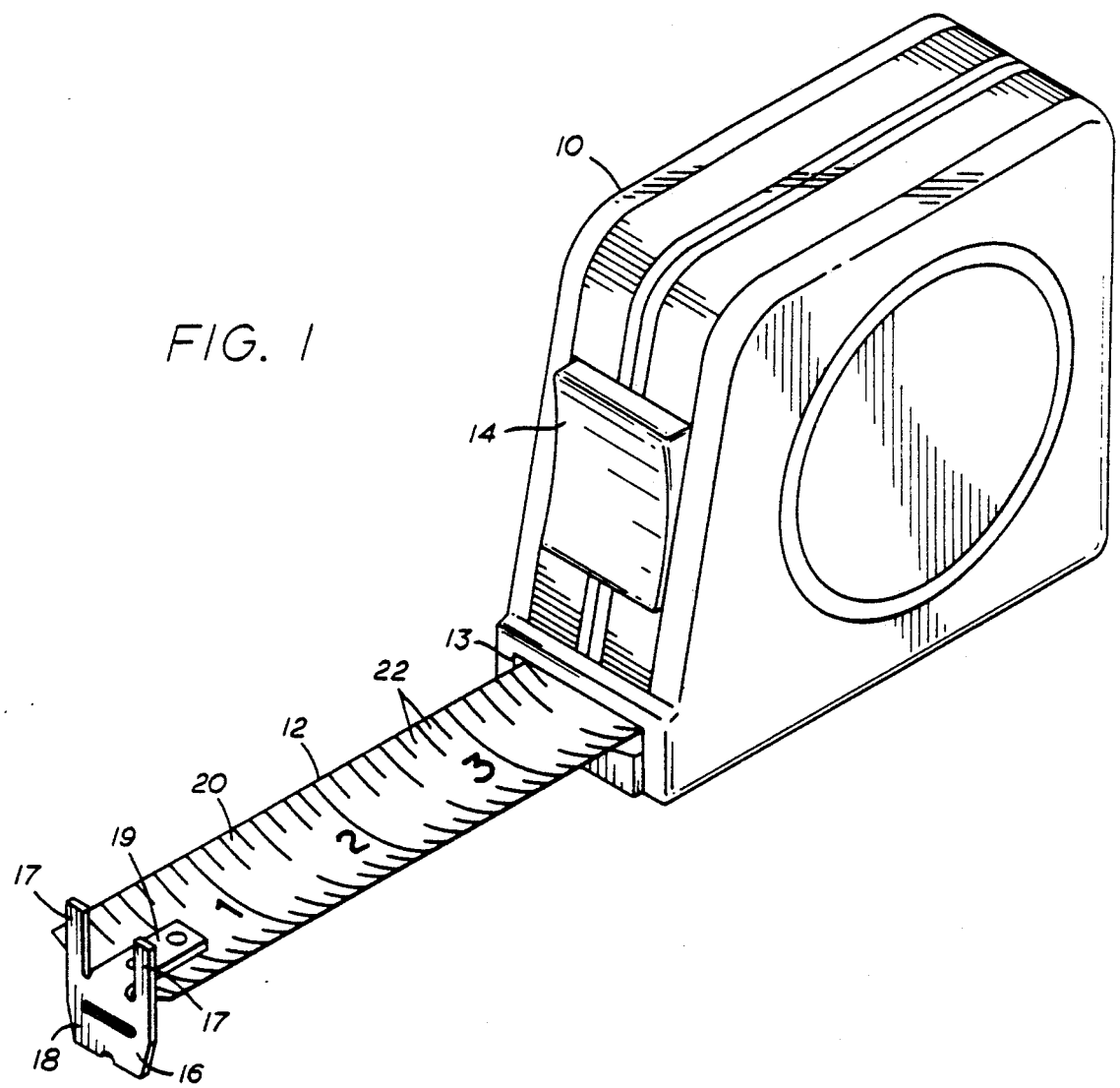
FIG. 1 is a perspective view of the measuring tape of the present invention with the tape partially extended.

Referring initially to FIG. 1, the measuring tape of the present invention includes a metal case 10 for housing a length of metal, preferably steel, tape 12. The case has a retraction system (not shown) for retracting the tape 12 into the case 10 through aperture 13. Retraction systems are well known in the art and generally include a coiled spring attached to one end of the tape 12 which is coiled around the spring within the case 10. As the tape 12 is withdrawn through aperture 13 from the case 10, the coiled spring is further coiled for the subsequent retraction of the tape 12. A thumb catch 14 is provided on the case 10 to hold the tape 12 in the extended position. A stop 16 is provided on the end of the tape 12 to prevent the tape 12 from passing through the aperture 13 and thus retracting into the case 10. The stop 16 has upper grips 17 and a lower grip 18 which are disposed opposite each other and approximately perpendicular to the plane of the tape 12 for engaging the work piece to be measured. An attachment arm 19, which is substantially parallel to the plane of the tape 12, is provided on stop 16 for attachment to tape 12 by rivets 13, 15, which protrude through tape 12 and attachment arm 19.

The upper surface 20 of the tape 12 contains linear graduations 22 which may be scaled in inches, centimeters or any other convenient scale. Where the tape 12 is scaled in inches/feet, the sides are normally graduated into 1/64ths of an inch. For purposes of illustration in FIG. 1, the tape 12 is shown partially extended outside the case 10. The tape 12 retracted into the case 10 has a length of slightly greater than 300 inches, and is graduated to a length of 300 inches. Tapes may be of various lengths and other tape lengths or scales may be used without deviating from the present invention.

Figure 2:
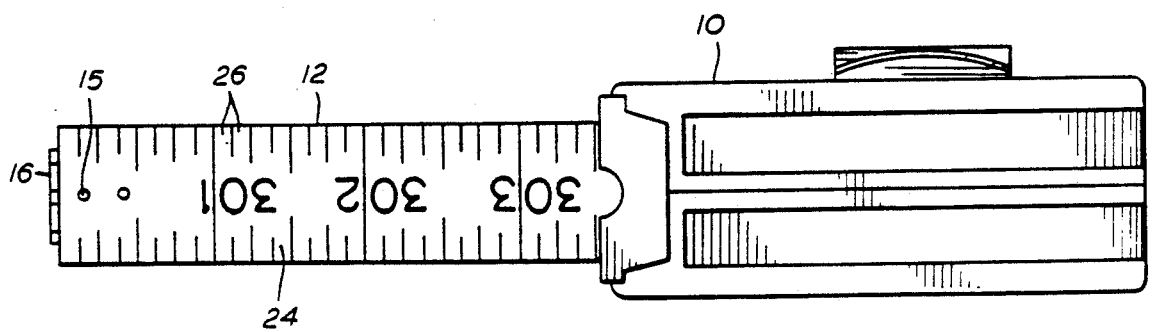
FIG. 2 is a bottom view of the measuring tape shown in FIG. 1.
Figure 3:
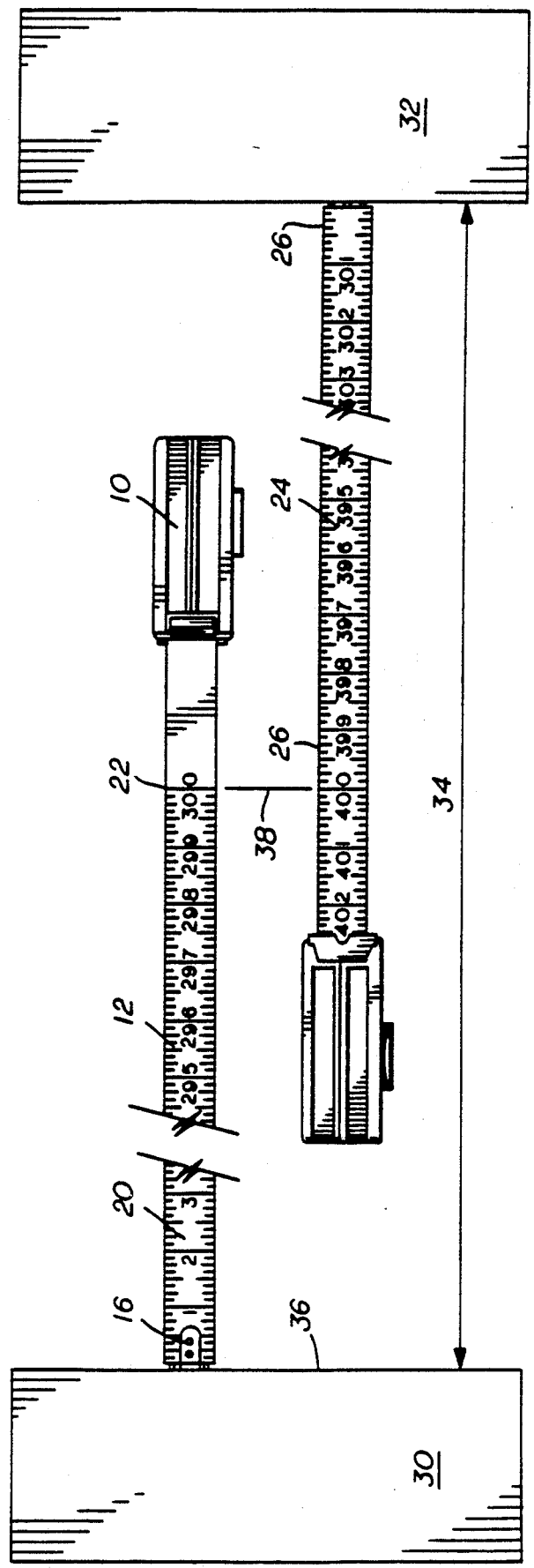
FIG. 3 is a schematic demonstrating the use of the present invention to measure a length greater than the length of the tape.

Referring now to FIGS. 2 and 3, the reverse or underside 24 of the tape 12 is shown with additional linear graduations 26. The lower graduations 26 are in the same scale as the upper graduations 22. The tape 12 is continuous in that the lower graduations 26 begin with the identical numerical measurement with which the upper graduations 22 end. The lower graduations 26 are laid out in increasing numerical order from the stop 16 to the lower graduation terminus (not shown) of the tape 12. For the 25 foot tape measure of the preferred embodiment, upper graduations 22 are scaled from 0 to 300 inches, and lower graduations 26 are scaled from 300 to 600 inches. Together, the graduations 22, 26 permit a measurement of 50 feet or 600 inches, twice as long as prior art tapes.

Referring now to FIG. 3, the measuring tape of the present invention may be used to measure the distance between two objects 30, 32 separated by a distance 34. The distance 34 is greater than 25 feet, the length of the tape 12. The tape stop 16 is abutted to the inner side 36 of object 30, and fully extended to its final upper graduation 22 of 300 inches. A pen, scribe, or other instrument may then be used to make a mark 38 to record the distance of 25 feet. The tape 12 is then reversed with the 300 inch lower graduation 26 abutted against the inner side 40 of object 32. The tape 12 is then extended from the inner side 40 of object 32 to the mark 38. The measurement on the lower graduation 26 is then the total distance 34 between the two objects 30, 32 without performing any calculations.

Although the application of the invention to a measuring tape has been described, the invention may be employed in a multi-sided measuring device, such as a simple ruler, manual tape measures, steels, a three-sided scale, protractors or circular angle measuring devices, or other linear devices. In such devices, the first surface will be enscribed, imprinted or otherwise marked with 0 to N units, the next adjacent side marked with N to 2n units, and each further side marked with corresponding N number of units in an ascending manner. For example, 30 inch steel will be marked from 0 to 30 inches on one side, and 30 to 60 on the opposite side.

While a preferred embodiment of the invention has been shown and described, modifications thereof can be made by one skilled in the art without departing from the spirit of the invention.

I claim:

1. A measuring tape for measuring a linear distance comprising:
    a tape having a first side and a second side;
    a case for housing said tape;
    said tape having one end secured within said case whereby the other free end may be extended from said case a maximum length;
    said first side having first graduations beginning at zero at said free end and sequentially scaled to a measurement N substantially equal to said maximum length of said tape;
    said first and second sides including numbers for said first and second graduations, said numbers having a top with the top of said numbers on said first and second sides being adjacent a common edge of said tape;
    said second side having second graduations beginning at said free end and starting with said measurement N and sequentially scaled to a measurement 2N substantially equal to twice said maximum length of said tape whereby said first and second graduations increase in a common direction on said tape and measure a linear distance substantially twice said maximum length of said tape such that said free end may be aligned with one end of the linear distance, said tape extended to said measurement N, and said measurement N being marked, and said tape being reversed with said free end aligned with the other end of the linear distance and the measurement on said second side of said tape at the mark indicating the total measurement of the linear distance; said first and second sides including numbers for said first and second graduations, said numbers having a top with the top of said numbers on said first and second sides being adjacent a common edge of said tape.

2. A method of measuring the distance between two objects, comprising the steps of:
    abutting against one object the free end of an extendible having graduations for a length 0 to N on one side of the tape, N being shorter than the distance;
    extending the tape fully to its final upper graduation N on the one side;
    marking the length N;
    reversing the tape;
    abutting against the other object the free end of the tape, said free end on the other side of the tape having graduations beginning with N and extending to 2N;
    extending the tape to the mark; and
    reading the distance between the two objects from the other side of the tape at the mark without performing any calculations.

* * * * *